Oct. 3, 1933.  C. SPAETH  1,929,291
MEASURING DISPENSING APPARATUS
Filed Nov. 10, 1930   2 Sheets-Sheet 1
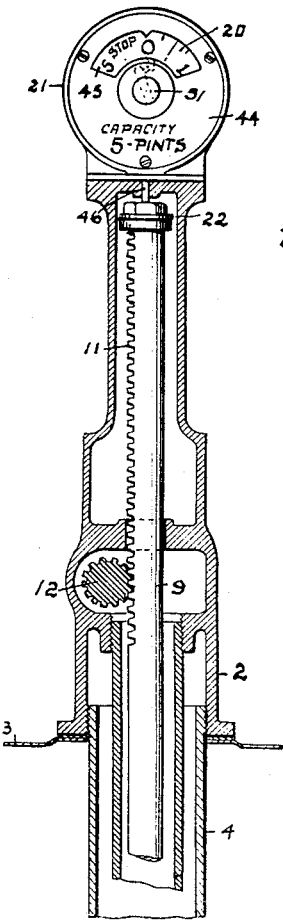
FIG. 1
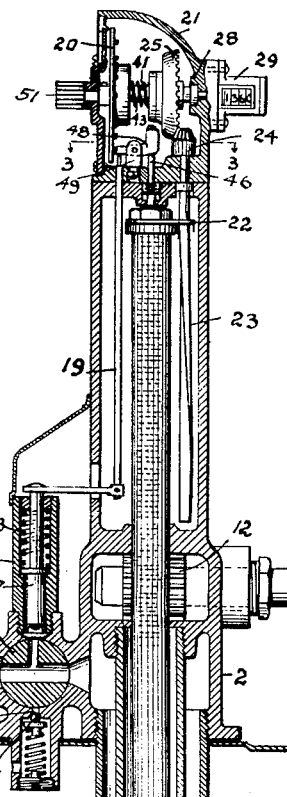
FIG. 2
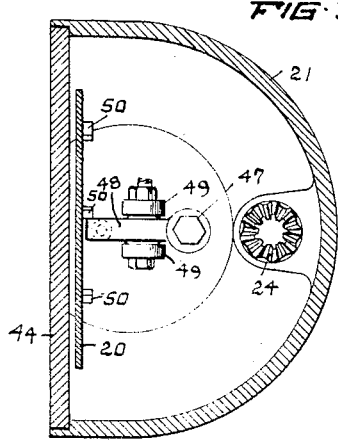
FIG. 3
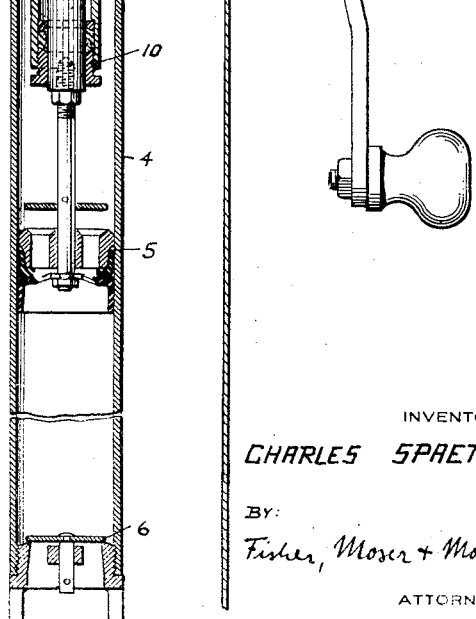
INVENTOR
CHARLES SPAETH
BY:
Fisher, Moser + Moore.
ATTORNEY Oct. 3, 1933.   C. SPAETH   1,929,291
MEASURING DISPENSING APPARATUS
Filed Nov. 10, 1930   2 Sheets-Sheet 2
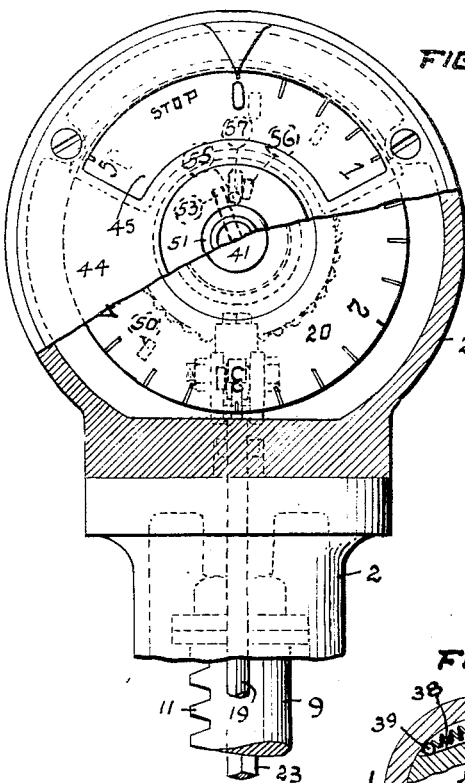
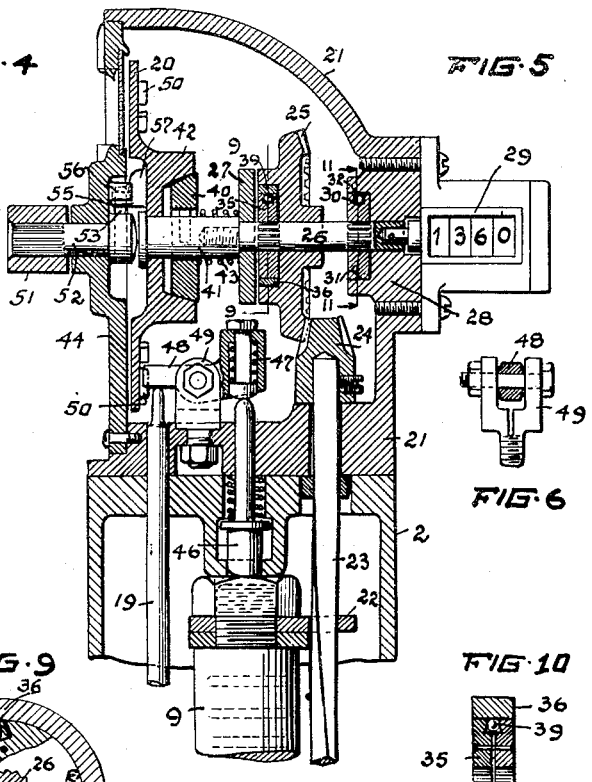
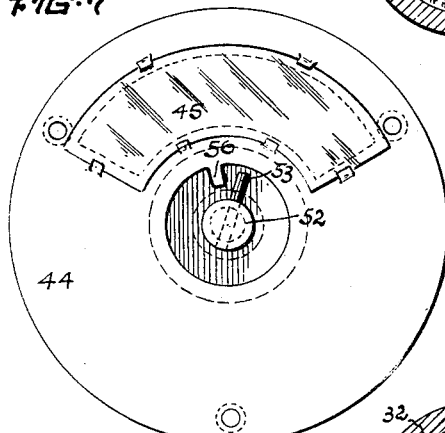
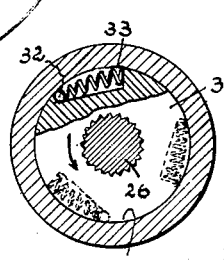
INVENTOR
CHARLES SPAETH
BY: Fisher, Moser & Moore
ATTORNEY Patented Oct. 3, 1933

1,929,291

UNITED STATES PATENT OFFICE 1,929,291

MEASURING DISPENSING APPARATUS

Charles Spaeth, Cleveland, Ohio

Application November 10, 1930
Serial No. 494,460

9 Claims. (Cl. 221—103)

My invention relates to measuring apparatus, especially pumps for dispensing fluids or semi-liquids in measured quantities, particularly grease. To exemplify, grease pumps are usually operated by an attendant or employee at a dispensing station in the presence of the purchaser. To protect the purchaser against mistake or fraud and to permit the operator to check his own operations, it is desirable and a requirement of laws that the total amount of grease being delivered to a customer shall be correctly registered and plainly indicated at the pump at the time of the sale. Accordingly, the present pump includes means for checking and indicating the amount of grease delivered during each individual sale and dispensing operation. It is also desirable that the total amount of grease dispensed and withdrawn from the source of supply shall be independently recorded to safe-guard the interests of the owner or merchant. To effect that purpose a merchant's counter or recording device is also embodied in the present pump. These two instruments are operated automatically by the pump, which is of the reciprocable type and arranged to automatically activate the customer's indicator and also the merchant's counter during the dispensing or delivery stroke of the pump piston. Thus as each charge is being dispensed the customer's indicator registers and indicates the amount being dispensed, each full charge being represented by graduations and figures plainly displayed on a rotatable dial; and the amount being dispensed is also recorded on the merchant's counter or meter. The latter device provides a permanent record for all the grease passing through the pump, but the fractional withdrawals represented by the customer's indicator need only be registered and indicated temporarily during the transaction. The customer's indicator is therefore constructed and arranged to permit it to be returned to zero with convenience and dispatch, that is, to be readily reset for the next customer after each dispensing operation, without affecting or operating the merchant's counter or meter. However, after the pump has been fully discharged, it is desirable that re-setting operations be prevented or held in check until the pump is again fully charged or completely filled with a correctly measured charge. To achieve that purpose the present pump includes mechanism for automatically locking the customer's indicator or dial preliminary to charging or filling the pump, and then automatically unlocking the same dial when the pump is fully charged, preferably when the new charge is placed under a given degree of compression. Thus, should the supply run short or be inadequate in filling the pump, the dial will remain locked. On the other hand, the operating mechanism for the dial and counter is particularly constructed to permit the pump to be operated without injury or ill effect to said mechanism and parts when the dial itself is locked. In that case, should the operator release any grease remaining in the pump barrel after a dispensing operation, instead of filling the pump again fully as a preliminary step, the purchaser will receive the amount dispensed without being charged for it and the merchant's recording device will be actuated, thereby debiting the operator with the amount dispensed. Hence it behooves the operator to fill the pump completely before each dispensing operation, and the buyer is only required to note that the indicating dial is set at zero at the beginning of pumping operations to prevent fraud or deceit. In other words, the customer would receive whatever the pump contained without having the customer's dial register the amount delivered, while the dispensing operation will be recorded on the merchant's counter or recording device, thereby penalizing the operator should he either fail to attend to his duties carefully, or attempt to defraud his customer or employer.

In the accompanying drawings, Figs. 1 and 2, respectively, are sectional views in different planes of a measuring and dispensing pump embodying my invention, and Fig. 3 is a sectional plan view, enlarged, on horizontal line 3—3 of Fig. 2. Fig. 4 is a front view, partly in section, of the meter assembly at the top of the pump, and Fig. 5 is a sectional view vertically of the meter in the plane of the meter shaft. Fig. 6 is an elevation of the clamping support for the locking pawl, and Fig. 7 is a rear view of the front cover plate. Fig. 8 is a front view of the customer's indicating dial for the meter. Fig. 9 and Fig. 10 are enlarged sectional views of the driving clutch for the meter shaft, and Fig. 11 a sectional view of the locking clutch for the meter shaft.

The pump comprises a hollow main body 2 adapted to be seated upon and affixed to the top of a tank or receptacle 3 containing the liquid or grease to be dispensed. A pump cylinder or barrel 4 containing a valved piston 5 extends downwardly from body 2 into the tank, and a check valve 6 is provided at the intake end of the cylinder which permits the grease to be drawn into the cylinder upon the up-stroke of the piston and to trap the charge upon the down stroke. The grease is discharged through an extension or outlet 7 at one side of the pump, and a rotatable two-way plug valve 8 is utilized in the present pump to control the discharge or dispensing operations of the pump in substantially the same way as shown and described in my application for patent for a pump, filed April 21, 1930, Serial No. 445,900. Usually the grease is delivered to the customer through a hose and valved nozzle attached to extension 7, but these parts are not shown in the drawings, being well known.

The pump piston 5 is connected to a reciprocable plunger 9 which extends through a bearing 10 located within cylinder 4, and rack teeth 11 on the upper part of this plunger engage a pinion gear 12 which is adapted to be rotated in opposite directions alternately by a crank handle 14 located outside of the pump body. The piston may be reciprocated manually by the means described to draw a charge of grease into the cylinder upon a full upstroke of the plunger, and this charge is displaced or transferred from the lower end of the cylinder to the upper end thereof and into the hollow bottom of the pump body upon the reverse or down stroke of the plunger. The capacities of the cylinder on opposite sides of the piston is such that when plunger 9 descends into cylinder 4 beyond the internal bearing 10 it will displace a predetermined amount of grease and compact and place it under compression in the upper part of the cylinder, providing valve 8 is closed. The voids in the grease are thereby closed, and should an objectionable amount of air be present in the charge it is compressed so that the successive charges of grease are uniformly and correctly measured before they are discharged from the pump. To promote that purpose, the amount of grease transferred from the lower to the upper part of the pump cylinder upon the down stroke of the piston is preferably in excess of the correct measure, and the surplus is returned or fed back into tank 3 by way of a valved by-pass opening or passage 15 controlled by the two-way valve 8, see Fig. 2. In other words, a spring-controlled by-pass valve 16 is provided which may be adjusted to open only under a predetermined pressure during the down stroke of the piston when the discharge outlet 7 is closed by valve 8. During this interval a small spring-pressed piston 17 confined within a cylindrical extension 18 located at one side of body 2 above valve 8 is exposed to the charge of grease under pressure within the pump cylinder. Accordingly, this small piston 17 is moved upwardly when a predetermined pressure condition is reached within the cylinder, thereby raising an upright member or rod 19 fixed to the upper protruding end of piston 17. The upward movement of piston 17 occurs only when a full charge of grease is present and compressed in the pump, and uplift of rod 19 is then utilized to unlock or control the rotatable movements of an indicating dial 20 housed within a metal casing 21 mounted upon the upper end of hollow body 2. Dial 20 informs the purchaser and operator of the amount of grease dispensed and permits the purchaser to check dispensing operations. Moreover, the dial will be locked against rotation whenever the supply is inadequate or exhausted, thus indicating when the pump is or is not dispensing grease, all as will hereinafter appear.

In operation, dial 20 is rotated automatically in one direction by and through a train of clutch-controlled driving members which are operatively dependent upon the reciprocable movement of the pump piston and its operating rack 9. As shown, a perforated plate 22 is fixed to its upper end to slidably engage and rotate a flat-sided twisted bar or spiral shaft 23 whenever the crank handle is turned to operate the pump. Shaft 23 is suspended within the hollow upper end of body 2 closely adjacent and parallel to rack 9, and is square or rectangular in cross section to fit the opening in plate 22 through which it extends. A beveled pinion gear 24 is secured to the upper end of shaft 23 within casing 21, which pinion gear meshes with a larger bevel gear 25 sleeved loosely and rotatably upon a horizontal drive shaft 26 which extends through a cross bar 27 within casing 21 and also through a boss or bearing 28 at the rear of the casing. A suitable recording device, such as a Veeder counter 29, is secured to boss 28 and connected to shaft 26 to add up and record the total amount of grease withdrawn from tank 3. Counter 29 is provided to protect the merchant and operates only when shaft 26 rotates in one direction, or anti-clockwise in the present instance. A reverse rotation of shaft 26 is prevented by a locking clutch 30 keyed to shaft 26 and rotatably confined within a circular recess 31 at the inner side of boss 28. This clutch includes spring-pressed balls 32 arranged to ride upon inclined cam surfaces 33 within the clutch body, whereby the balls may frictionally engage or wedge against the circular wall of recess 31 to lock shaft 26 against rotation in a clockwise direction when gear 25 is rotated in the same direction upon the downward stroke of the pump piston while a charge of grease is being measured and compressed preliminary to dispensing operations.

Dispensing occurs upon the lift stroke of the pump piston, and it is then that the customer's indicating dial is rotated anti-clockwise by gear 25 and a driving clutch 35 confined within a ring 36 pressed tightly within said gear. The body 37 of this driving clutch is keyed to shaft 26 and embodies inclined cam surfaces 38 and spring-pressed balls 39 similar to clutch 30, to automatically connect and disconnect drive gear 25 and shaft 26. Thus in rotating gear 25 in an anti-clockwise direction the driving clutch connects with and drives shaft 26 to rotate dial 20 and also operate counter 29. Upon rotating the gears reversely the driving clutch 35 releases itself and the locking clutch 30 prevents shaft 26 from rotating in a clockwise direction. The rotatable movement of shaft 26 in an anti-clockwise direction is transmitted to the indicating dial 20 by means of a friction clutch which includes a cone member 40 keyed slidably to an extension 41 of shaft 26 and constantly held in frictional engagement with the recessed hub 42 of dial 20 by a compression spring 43, see Fig. 5. Hence dial 20 may be rotated independently of drive shaft 26, and is rotatably supported on the overhanging extension 41 closely adjacent the stationary cover plate 44 at the front of meter casing 21. Access to the dial is prevented by cover plate 44, but a segmental portion of the dial is always exposed to view through a glass window 45 to permit the movements and position of the dial to be observed and readings to be taken. The dial can be reset to naught or zero by hand, as will hereinafter be explained, but it can be rotated only in one direction by hand, and its rotation in the opposite direction can only be obtained by operating the pump. And, should the supply of grease run short or a full charge be unobtainable in filling the pump, dial 20 will be locked against rotatable counting movements. Under such conditions friction clutch 40 will slip if gear 25 is caused to revolve in an anti-clockwise direction upon a dispensing stroke of the pump piston.

Locking of the dial is effected when the operating rack or plunger 9 for the pump piston reaches the limit of its upward movement or stroke, and unlocking of the dial occurs when the piston and rack are lowered, providing the pump cylinder contains a full charge. Thus, to lock the dial upon the up-stroke of the rack and plunger 9 as stated the upper end of the rack is caused to strike a short spring-pressed pin 46 confined within the top of hollow body 2 and extending into the bottom of meter casing 21. The upper end of this pin is adapted to press upwardly against a spring-pressed bolt 47 carried within one end of a pivoted locking dog or pawl 48 mounted opposite the inner face of dial 20. This dog or pawl is pivoted at its middle upon a divided supporting member 49 and adapted to be tilted by pin 46 to wedge against the dial or else to interlock with a series of lugs or projections 50 extending downwardly from the dial. Supporting member 49 may possess spring properties or be constructed to clamp the pawl frictionally therein so that it will remain in the position to which it is tilted, and unlocking is effected by a reverse tilting movement obtained by push rod 19 which is connected to the pressure controlled piston 17 and extends upwardly through hollow body 2 into engaging position with the locking end of the dog or pawl 48. In operation, rod 19 and piston 17 are raised when a full charge of grease is placed under compression and a predetermined pressure exists within the pump cylinder as set and fixed by the pressure by-pass valve 16. Uplift of push rod 19 will then tilt the locking end of pawl 48 upwardly out of the path of movement of the lugs 50 on the dial and permit the dial to be rotated by the pump mechanism. Then when the pressure beneath the rod operating piston 17 is relieved the piston and rod will be lowered by spring 13 within the cylindrical extension 18, but pawl 48 will be held frictionally in an inclined unlocking position. On the other hand when the pawl is tilted to a horizontal position to prevent the dial from rotating it will remain there until the pump piston is lowered and the pump again filled with a full charge of grease and the grease subjected to a given pressure, for example, a pressure of about 450 lbs.

Assuming that the pump has been operated and a predetermined amount of grease has been dispensed the total amount delivered to the customer will show on dial 20 at the front of the meter casing, and the same amount will be recorded on the merchant's counter 29 at the rear. The operator must then re-set the customer's dial to zero or naught for the next sale, which operation may be accomplished manually by rotating a knob 51 fixed to a short shaft 52 extending centrally through the stationary cover 44. The knob and shaft may be rotated independently of meter shaft 26 and dial 20, but a pin 53 extending radially from the inner end of shaft 52 is adapted to engage a projection 54 on the front face of dial 20 when the dial is so rotated in a clock-wise direction by hand after the dispensing operation. Meter shaft 26 cannot be rotated in a clockwise direction by knob 51 and dial 20 because locking clutch 30 prevents such rotation, but dial 20 can be so rotated inasmuch as friction clutch 40 will permit slip movement between its clutching members when the meter shaft is held against rotation. However, the return or clock-wise movement of the dial to a zero position is limited or fixed by a projection 55 on the dial and a stop lug 56 on cover 44, see Figs. 3 and 4. That is, in re-setting the dial to a zero position by turning the knob 51 in a clockwise direction the pin 53 on the knob shaft will engage projection 55 on the dial and the same projection or an extension 57 thereof will be rotated with the dial into contact with stop lug 56 on cover 44. The dial can never be rotated by knob 51 in an anti-clockwise direction, that is, in a counting direction, because the pin 53 will first move apart from the projection 55 on the dial and then engage the stop lug 56 on cover 44 before it can again strike projection 55 on its opposite side. Therefore, stop lug 56 serves a double purpose, first, it limits the rotative movement of the dial when turned by hand and driven by pin 53, in a clock-wise direction to reset the dial at zero, and secondly, it limits the rotative movement of the pin and knob when turned in an anti-clockwise direction so that the dial cannot be rotated in that direction by hand. Only when the dial is unlocked, and the pump itself is operated will the dial rotate in an anti-clockwise counting direction and register and indicate the amount being dispensed, and unlocking of the dial can only be effected by charging the pump cylinder fully and completely. Should the operator operate the pump to dispense grease when the dial is locked the purchaser will receive the amount dispensed without having it appear on the dial, but the operator will nevertheless be charged on the Veeder counter with the amount delivered.

What I claim, is:

1. In a measuring dispensing apparatus, a pump having a rotatable indicator, automatic means for rotating said indicator in dispensing operations of said pump, automatic means actuated by the pump to lock said indicator against rotation when said pump is not fully charged and means for manually turning the indicator in one direction only to permit re-setting the indicator subsequent to charging operations, said latter means including a friction clutch to permit rotatable movements of said indicator independent of said automatic rotating means.

2. In a measuring dispensing apparatus, a reciprocable pump having a registering indicator, means coupled to an operating part of said pump for rotating said indicator frictionally in one direction, manually-operable devices for rotating said indicator in the opposite direction, and means for locking said indicator at the end of each discharge stroke against rotative movement.

3. In a measuring dispensing apparatus, a lift pump for dispensing measured charges and placing the charge under a predetermined pressure during filling procedings, a rotatable means for indicating the amount delivered at each dispensing operation of said pump, means actuated at the end of each delivery stroke of said pump to lock said indicating means against rotation, and means to unlock said locking means when the charge is under a predetermined pressure.

4. In a measuring dispensing apparatus, a reciprocating pump for dispensing measured charges under pressure, rotatable and resettable means for indicating the amount of matter delivered at each dispensing operation of said pump, means coupled with said pump for actuating said indicating means in one direction, and locking means actuated by the reciprocating movements of said pump to positively lock said indicating means against rotation and resetting during filling operations of said pump.

5. In a measuring dispensing apparatus, a reciprocating pump, a rotatable and resettable indicating device for measuring the amount delivered at each dispensing operation of said pump, rotatable means including a clutch for actuating said indicating device when the pump is operated in one direction, locking means for said indicating device to prevent its rotating and resetting during filling movements of said pump until a full charge is taken into said pump, and means to reset said indicating device when unlocked.

6. In a measuring dispensing apparatus, a pump mechanism having means to place a charge under compression, indicator devices operatively connected with said pump mechanism, and means controlling the operation of said indicator operatively dependent upon the presence of a compressed charge in the pump.

7. In a measuring dispensing apparatus, a pump having a reciprocable plunger, indicating means operatively connected with said plunger, a locking device for said indicating means adapted to be thrown into action upon the movement of the plunger in one direction, and means for releasing said locking device adapted to be activated when the plunger is moved in the opposite direction.

8. In a measuring dispensing apparatus, a reciprocating pump, a rotatable indicating device for measuring the amount delivered at each dispensing operation of said pump, operating means coupled with a reciprocatary part of said pump for rotating said indicating device in one direction, including a driving clutch, locking means actuated by the pump at the end of its discharge stroke to lock said rotatable indicating means, means actuated by the pumped liquid within said pump to unlock said locking means when said pump is fully charged, and manually operable means for resetting said device.

9. In a measuring dispensing apparatus, a pump, a reciprocable plunger for said pump, resettable means for indicating the amount delivered at each dispensing operation, rotatable means coupled with the reciprocating plunger of said pump during the filling stroke of said plunger for automatically actuating said indicating means during the filling stroke of said plunger, means to lock said indicating means at the end of each full dispensing stroke of said plunger, and means to unlock said indicating means after each complete refilling of said pump.

CHARLES SPAETH.